United States Patent
Ichikawa et al.

(10) Patent No.: US 10,183,581 B2
(45) Date of Patent: Jan. 22, 2019

(54) CONTROL SYSTEM FOR VEHICLE DRIVE MOTOR

(71) Applicant: AISIN SEIKI KABUSHIKI KAISHA, Kariya-shi (JP)

(72) Inventors: Tetsuro Ichikawa, Nagoya (JP); Tomohiro Fukushima, Obu (JP); Hideki Kakisako, Anjo (JP); Shota Hirose, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/562,241

(22) PCT Filed: Mar. 18, 2016

(86) PCT No.: PCT/JP2016/058664
§ 371 (c)(1),
(2) Date: Sep. 27, 2017

(87) PCT Pub. No.: WO2016/158486
PCT Pub. Date: Oct. 6, 2016

(65) Prior Publication Data
US 2018/0079311 A1  Mar. 22, 2018

(30) Foreign Application Priority Data
Apr. 1, 2015 (JP) .................................. 2015-075152

(51) Int. Cl.
*H02P 7/00* (2016.01)
*B60L 3/06* (2006.01)
(Continued)

(52) U.S. Cl.
CPC .............. *B60L 3/06* (2013.01); *H02P 29/032* (2016.02); *H02P 29/62* (2016.02)

(58) Field of Classification Search
CPC .......... H02P 29/60; H02P 29/40; H02P 23/14; H02P 23/00; H02P 21/14; H02P 3/00;
(Continued)

(56) References Cited

U.S. PATENT DOCUMENTS 6,605,911 B1 * 8/2003 Klesing ................ H02H 7/0851
123/361
7,071,645 B2 * 7/2006 Hahn ........................ H02P 3/12
318/362
(Continued)

FOREIGN PATENT DOCUMENTS

JP 2003-284375 A 10/2003
JP 2008-109816 A 5/2008
(Continued)

OTHER PUBLICATIONS

International Search Report dated Jun. 7, 2016 in PCT/JP2016/058664, filed on Mar. 18, 2016.

*Primary Examiner* — Rina Duda
(74) *Attorney, Agent, or Firm* — Oblon, McClelland, Maier & Neustadt, L.L.P.

(57) ABSTRACT

A control system for a vehicle drive motor includes a motor torque obtaining portion, a current distributing state obtaining portion obtaining a state of current distribution to coils of respective phases of a stator of the motor, a temperature sensor detecting temperature of a specific phase coil, a motor torque control portion updating other phase estimated temperatures by using the coil sensor temperature and an added-up value of a temperature rise per unit time of each of other phase coils at each time point, the motor torque control portion controlling the motor torque by using the other phase estimated temperatures, wherein the temperature rise per unit time of each of the other phase coils at each time point is determined by the motor torque control portion in accordance with a combination of the motor torque and the state of current distribution at each time point.

9 Claims, 7 Drawing Sheets

(51) Int. Cl.
*H02P 29/032* (2016.01)
*H02P 29/62* (2016.01)

(58) Field of Classification Search
CPC ....... H02P 15/20; B60W 20/20; B60W 10/06; H02K 21/14
USPC .................................................. 318/432, 434
See application file for complete search history.

(56) References Cited

U.S. PATENT DOCUMENTS

| | | | |
|---|---|---|---|
| 7,615,951 B2* | 11/2009 | Son | H02P 29/64 318/432 |
| 7,658,261 B2* | 2/2010 | Pfund | B60W 10/02 180/292 |
| 8,174,222 B2* | 5/2012 | Patel | B60K 1/02 318/400.01 |
| 2005/0242760 A1 | 11/2005 | Fujita et al. | |
| 2007/0132446 A1* | 6/2007 | Kleinau | B60L 15/025 324/160 |
| 2008/0315814 A1 | 12/2008 | Takizawa et al. | |
| 2011/0084638 A1* | 4/2011 | Patel | B60K 1/02 318/400.32 |
| 2014/0222269 A1* | 8/2014 | Tsutsumi | B60W 20/40 701/22 |

FOREIGN PATENT DOCUMENTS

| | | | |
|---|---|---|---|
| JP | 2010-011546 A | 1/2010 | |
| JP | 5194608 B2 | 5/2013 | |

\* cited by examiner

Temperature-to-be determined

Time counter

CONTROL SYSTEM FOR VEHICLE DRIVE MOTOR

TECHNICAL FIELD

The present invention relates to a control system for a vehicle drive motor.

BACKGROUND ART

Conventionally, a hybrid vehicle of which a drive source is an engine and a motor is known. As the motor, a three-phase alternating current motor is generally used for the hybrid vehicle. In a case where the motor is caused to output torque serving as a wheel drive force, direct current voltage supplied from a battery is converted into alternating current voltage at an inverter, and then is applied to the motor.

For example, in a case where a wheel of the above-described hybrid vehicle falls into a recess and/or a ditch on a road and cannot rotate, a rotor of the motor does not rotate even though a driver presses on an accelerator pedal because the wheel and the motor are connected to each other via, for example, a gear train. Such a state is an example of "a motor lock state".

On the hybrid vehicle, a motor temperature is detected by a temperature sensor (for example, a thermistor) which is provided to the stator of the motor, and a control of suppressing a motor output is performed when the detected temperature reaches a predetermined upper limit, thereby preventing a negative influence due to heat from occurring to the motor. In this case, a configuration in which three temperature sensors are provided to correspond to a U-phase coil, a V-phase coil and a W-phase coil, respectively, so that temperature of each of the phase coils is detected leads to a cost increase and/or a complicated control. Accordingly, a simple and practical configuration is that one temperature sensor is provided to correspond to a specific phase coil, the coil temperatures of the other two phases are estimated on the basis of the temperature of the specific phase coil, and the estimated temperature is used for limiting the motor output.

In a case where the temperature sensor is provided only to the specific phase coil, when no electric current or substantially no electric current flows to the specific phase coil in the motor lock state and a high electric current flows intensively to the phase coils other than the specific phase coil, the other phase coils may be subject to the negative influence due to the heat. In order to prevent such a situation where the other phase coils receive negative influence due to the heat, for example, Patent document 1 discloses an aspect that a control portion of a control apparatus for a vehicle drive motor performs a first torque reduction control. Under the first torque reduction control, in a case where it is determined that a motor lock state is established on the basis of a user request torque and a number of rotations, the control portion obtains an estimated reach time at which phase coils other than a specific phase coil are estimated to reach an upper limit temperature on the basis of a temperature of the specific phase coil which is detected by a coil temperature detection portion. After the estimated reach time has passed, the control portion once reduces torque of a three-phase alternating current motor from the user request torque, and then restores the torque.

DOCUMENT OF PRIOR ART

Patent Document

Patent document 1: JP2010-11546A
Patent document 2: JP2003-284375A
Patent document 3: JP2008-109816A

OVERVIEW OF THE INVENTION

Problem to be Solved by the Invention

The estimated reach time of Patent document 1, however, is based on the temperature of the specific phase coil which is detected by the coil temperature detection portion. Therefore, an actual reach time may possibly be earlier than the estimated reach time in case where a requested motor torque which the motor is requested to output fluctuates in the motor lock state and thus a motor torque fluctuates, or in a case where a state of current distribution (for example, an electric angle) to each of the phase coils in the motor lock state fluctuates. Thus, a negative influence due to heat may be generated at the other phase coils. On the other hand, the actual reach time may possibly be later than the estimated reach time. In this case, the motor torque cannot be maintained up to a heat allowable limit of the motor coil, and thus a torque drop or a torque loss which a driver does not intend occurs easily.

An aspect of the present invention is made in consideration of the problem stated above, and a purpose is to provide a control system for a vehicle drive motor which can prevent a negative influence due to heat from occurring to other phase coils other than a specific phase coil even in a case where motor torque fluctuates and/or a state of current distribution to the coils of the respective phases changes.

Means for Solving Problem

A control system for a vehicle drive motor related to an aspect of the present invention includes a motor torque obtaining portion obtaining motor torque which a three-phase alternating current motor outputs, a current distributing state obtaining portion obtaining a state of current distribution to coils of respective phases of a stator of the three-phase alternating current motor, a temperature sensor detecting temperature of a specific phase coil included in the three phase coils as a coil sensor temperature, a motor torque control portion updating other phase estimated temperatures by using the coil sensor temperature and an added-up value of a temperature rise per unit time of each of other phase coils at each time point, the other phase coils corresponding to coils other than the specific phase coil included in the three phase coils, the other phase estimated temperatures corresponding to estimated temperatures of the other phase coils, and the motor torque control portion controlling the motor torque by using at least the other phase estimated temperatures. The temperature rise per unit time of each of the other phase coils at each time point is determined by the motor torque control portion in accordance with a combination of the motor torque and the state of current distribution at each time point.

With the above-stated configuration, since the temperature rises of the other phase coils per unit time are decided in accordance with the respective combinations of the motor torque and the current distributing state at each point of time, an estimation accuracy of the other phase estimated temperatures which are decided with the use of the added-up value of the temperature rises of the other phase coils per unit time at each point of time can be enhanced. Thus, the motor torque is controlled with the use of the other phase estimated temperatures with the high estimation accuracy, and accordingly the motor torque can be limited or restricted before the other phase estimated temperatures exceed heat allowable limit temperatures of the other phase coils. As a result, as the moor torque decreases, also the temperatures of the other phase coils are prevented from exceeding the heat allowable limit temperatures. Consequently, the adverse effects can be prevented from occurring at the other phase coils due to the heat. On the other hand, the motor torque can be maintained until the other phase estimated temperatures approach the heat allowable limit temperatures of the other phase coils. As a result, the motor torque can be maintained until the heat allowable limit temperatures are approached, thereby preventing the torque drop unintended by the driver as much as possible.

According to the above-described control system for the vehicle drive motor, the motor torque control portion may determine whether or not a representative estimated temperature decided with the use of the other phase estimated temperatures or at least one of the other phase estimated temperatures exceeds a threshold temperature, and in a case where the threshold temperature is exceeded, the motor torque control portion may limit the motor torque.

With the above-stated configuration, by adding up the temperature rises per unit time of the other phase temperatures which are decided on the basis of the combinations of the motor torques and the current disturbing states at each time point, the estimation accuracy of the other phase temperatures can be enhanced. Then, by making the motor torque to reduce in a case where the representative estimated temperature decided with the use of the other phase estimated temperatures or at least one of the other phase estimated temperatures is higher than the threshold temperature, the temperatures of the other phase coils can be prevented from exceeding the heat permissible limit temperature even if the motor torque fluctuates and/or the state of electric current distribution to each phase varies.

According to the above-described control system for the vehicle drive motor, the motor torque control portion may determine whether or not the three-phase alternating current motor is in a motor lock state by using at least one of the motor torque and a number of rotations of the three-phase alternating current motor, and in a case where the three-phase alternating current motor is in the motor lock state, the motor torque control portion may update at least the other phase estimated temperatures.

With the above-stated configuration, the other phase estimated temperatures can be updated when the motor lock state exists, and the motor torque can be controlled with the use of the updated other phase estimated temperatures. Consequently, the motor torque can be limited before the other phase estimated temperatures exceed the heat allowable limit temperatures of the other phase coils.

According to the above-described control system for the vehicle drive motor, the motor torque control portion may determine whether or not a difference between a previous representative estimated temperature decided with the use of the other phase estimated temperatures which are updated previously and the coil sensor temperature exceeds a threshold value, or whether or not a time period in which a number of rotations of the three-phase alternating current motor exceeds a predetermined number of rotations continuously is equal to or less than a threshold time period, and in a case where it is determined that the difference exceeds the threshold value or the time period is equal to or less than the threshold time period, the motor torque control portion may update at least the other phase estimated temperatures.

With the above-stated configuration, when the divergence exists between the coil sensor temperature and the temperatures of the other phase coils, or when the motor lock state is released and the rotations have just started, the motor torque control portion can update the other phase estimated temperatures and can control the motor torque in accordance with the updated other phase estimated temperatures. Thus, in the course of the return from the motor lock state to a normal state, the motor torque is controlled with the use of the other phase estimated temperatures including the high estimation accuracy. Consequently, the motor torque can be controlled before the other phase estimated temperatures exceed the heat allowable limit temperatures of the other phase coils. In consequence, because the motor torque decreases, the temperatures of the other phase coils can be made not to exceed the heat allowable limit temperature, thereby preventing the negative influence due to the heat from occurring to the other phase coils. On the other hand, the motor torque can be maintained until the other phase estimated temperatures approach the heat allowable limit temperatures of the other phase coils. As a result, the motor toque can be maintained until the heat allowable limit temperatures are approached, thereby to prevent as much as possible the torque drop which the driver does not intend.

According to the above-described control system for the vehicle drive motor, the motor torque control portion may determine whether or not an elapsed time from a time when a most recent motor lock state was released is less than a duration time of the most recent motor lock state, and in a case where the motor torque control portion determines that the elapsed time is less than the duration time, the motor torque control portion may update at least the other phase estimated temperatures.

With the above-stated configuration, when a divergence exists between the coil sensor temperature and the temperatures of the other phase coils, the motor torque control portion can update the other phase estimated temperatures and can control the motor torque in accordance with the updated other phase estimated temperatures. Thus, during the course of the return from the motor lock state to the normal state, the motor torque is controlled with the use of the other phase estimated temperatures including the high estimation accuracy. Consequently, the motor torque can be controlled before the other phase estimated temperatures exceed the heat allowable limit temperatures of the other phase coils. In consequence, because the motor torque decreases, the temperatures of the other phase coils can be made not to exceed the heat allowable limit temperature, thereby preventing the negative influence due to the heat from occurring to the other phase coils. On the other hand, the motor torque can be maintained until the other phase estimated temperatures approach the heat allowable limit temperatures of the other phase coils. As a result, the motor toque can be maintained until the heat allowable limit temperatures are approached, thereby to prevent as much as possible the torque drop which the driver does not intend.

According to the above-described control system for the vehicle drive motor, the updated other phase estimated temperatures may be corrected with the use of a comparison result between an estimated temperature of the specific phase and the coil sensor temperature.

With the above-stated configuration, the updated other phase estimated temperatures can be corrected with the use of the comparison result between the estimated temperature of the specific phase and the actual temperature of the specific temperature, thereby improving an accuracy of the updated other phase estimated temperatures.

According to the above-described control system for the vehicle drive motor, in a case where the representative estimated temperature or the other phase estimated temperatures is equal to or less than the threshold temperature, the motor torque control portion may reduce the motor torque in such a manner that the shorter an elapsed time from a time at which a most recent motor lock state was released is compared to a duration time of the most recent motor lock state, the lower the motor torque is reduced.

When compared to the duration time period of the most recent motor lock state, the shorter the elapsed time period from the time when the most recent motor lock state is released is, the larger divergence is expected between the other phase estimated temperatures and the coil sensor. By increasing the reduction amount of the motor torque accordingly, the electric current which flows to the other phase coils can be reduced. As a result, the other phase estimated temperatures can be prevented from exceeding the heat allowable limit temperature of the coil, and thereby preventing the occurrence of the negative influence due to the heat.

According to the above-described control system for the vehicle drive motor, in a case where the motor torque control portion relaxes the limit of the motor torque, the motor torque control portion may reduce the motor torque in such a manner that the longer a duration time of a present motor lock state is, the lower the motor torque is reduced.

With the above-stated configuration, the longer the duration time of the present motor lock state is, the longer the divergence is expected to exist between other phase estimated temperatures and the coil sensor temperature. Accordingly, by increasing the reduction level of the motor torque, the electric current flowing to other phase coils can be reduced, thereby preventing the other phase estimated temperatures from exceeding the heat allowable limit temperature. Consequently, it can be avoided that the negative influence caused by the heat occurs at the coils.

According to the above-described control system for the vehicle drive motor, in a case where the representative estimated temperature, the other phase estimated temperatures, or the coil sensor temperature exceeds the threshold temperature, the motor torque control portion may reduce the motor torque in such a manner that the larger a value obtained by subtracting the threshold temperature from the representative estimated temperature, the other phase estimated temperatures, or the coil sensor temperature is, the lower the motor torque is reduced by the motor torque control portion.

With the above-stated configuration, the higher the representative estimated temperature, the other estimated temperatures or the coil sensor temperature becomes beyond the threshold temperature, the lower the motor torque decreases. Accordingly, the other phase estimated temperatures can be prevented from exceeding the heat allowable limit temperature of the coil, thereby preventing the negative influence due to the heat from occurring to the other phase coils.

Effects of the Invention

According to an aspect of the present invention, since temperature rises of other phase coils per unit time are decided in accordance with respective combinations of motor torque and a current distributing state at each point of time, an estimation accuracy of the other phase estimated temperatures which are decided with the use of an added-up value of the temperature rises of the other phase coils per unit time at each point of time can be enhanced. Thus, motor torque is controlled with the use of the other phase estimated temperatures with a high estimation accuracy, and accordingly the motor torque can be limited or restricted before the other phase estimated temperatures exceed heat allowable limit temperatures of the other phase coils. As a result, as the moor torque decreases, also the temperatures of the other phase coils are prevented from exceeding the heat allowable limit temperatures. Consequently, adverse effects can be prevented from occurring at the other phase coils due to heat. On the other hand, the motor torque can be maintained until the other phase estimated temperatures approach heat allowable limit temperatures of the other phase coils. As a result, the motor torque can be maintained until the heat allowable limit temperatures are approached, thereby preventing a torque drop or torque loss unintended by a driver as much as possible.

MODE FOR CARRYING OUT THE INVENTION

First Embodiment

Figure 1:
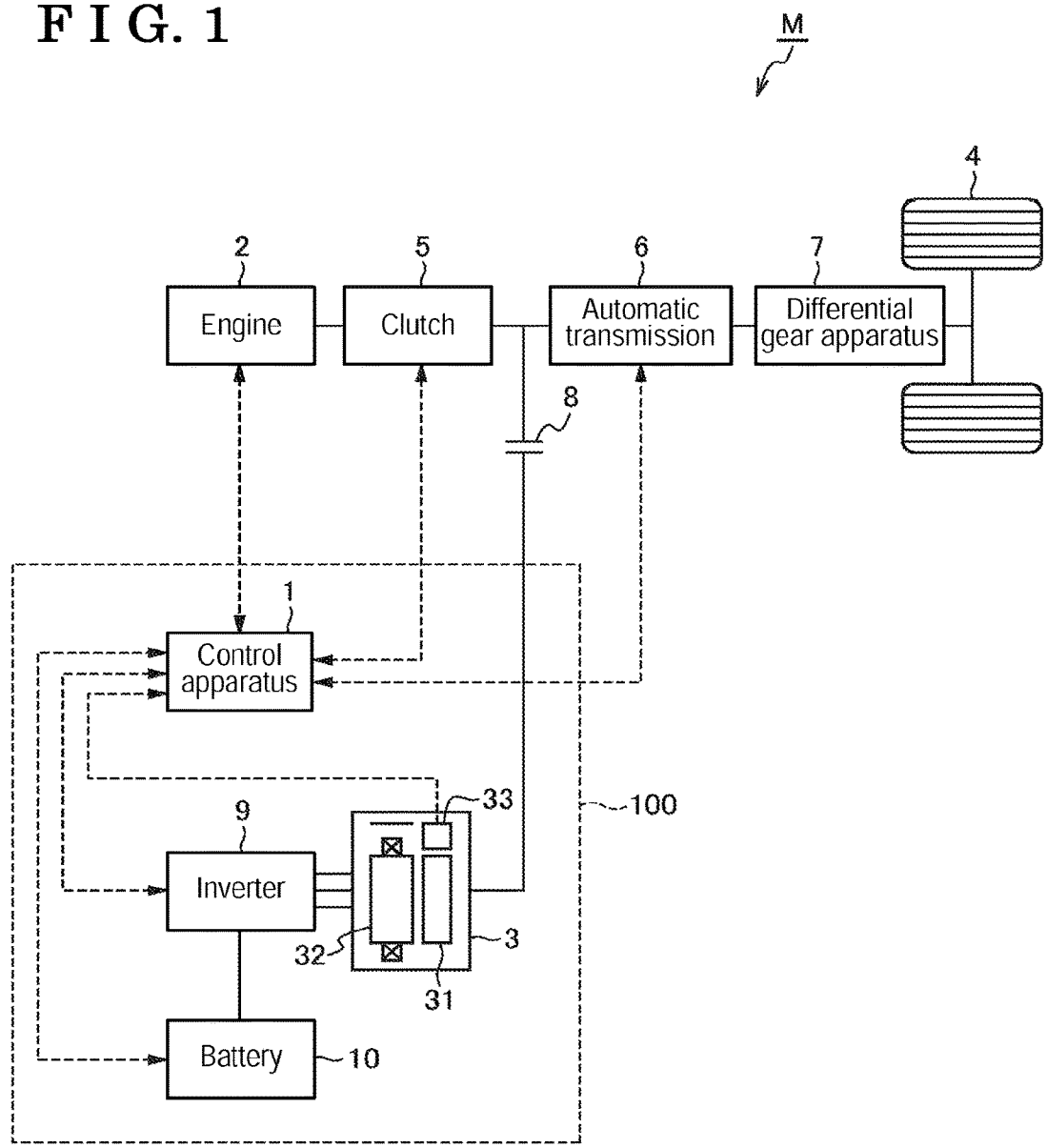
FIG. 1 is a view illustrating a schematic configuration of a hybrid vehicle of a first embodiment.

An embodiment of the present invention will be described with reference to the drawings. First, a configuration of a hybrid vehicle of a first embodiment will be described with reference to FIG. 1 which is a view illustrating a schematic configuration of the hybrid vehicle of the first embodiment. As illustrated in FIG. 1, a hybrid vehicle M includes an engine 2, a clutch 5, right and left wheels 4, an automatic transmission 6, a differential gear apparatus 7, a second clutch 8 and a control system 100 for a vehicle drive motor. The control system 100 for the vehicle drive motor includes a control apparatus 1, a motor 3, an inverter 9 and a battery 10.

As illustrated in FIG. 1, the hybrid vehicle M is a vehicle which includes the engine 2 and the motor 3, and uses either or both of them as a drive power source of the wheels 4. The automatic transmission 6 is connected to the engine 2 via the clutch 5. Output from the automatic transmission 6 is distributed and transmitted to the right and left wheels 4 via the differential gear apparatus (diff.) 7. In addition, also the motor 3 is connected to the automatic transmission 6 via the second clutch 8. The motor 3 is electrically connected to the battery 10 via the inverter 9.

The engine 2 is an apparatus which is driven by combustion of fuel inside the engine and takes out power. For example, known engines of various types including a gasoline engine and a diesel engine may be used as the engine 2.

The clutch 5 is provided between the engine 2 and the automatic transmission 6. The clutch 5 is a frictional engagement apparatus which can switch between transmission and block of transmission of the drive power between the engine 2 and the automatic transmission 6. The second clutch 8 is provided between the motor 3 and the automatic transmission 6. The second clutch 8 is a frictional engagement apparatus which can switch between transmission and block of transmission of the drive power between the motor 3 and the automatic transmission 6. In this case, the clutch 5 and the second clutch 8 are provided between the engine 2 and the motor 3, and thus it can be considered that the clutch 5 and the second clutch 8 form a frictional engagement apparatus which can switch between transmission and block of the transmission of the drive power between the engine 2 and the motor 3. By controlling a supply hydraulic pressure, the clutch 5 and the second clutch 8 can continuously control increase and decrease of a transmission torque capacity. As the clutch 5 and the second clutch 8, a dog clutch can be used, for example.

The motor 3 includes a function as a motor (an electric motor drive) generating power upon receiving supply of electricity and a function as a generator (a power generator or dynamo) generating electric power upon receiving supply of power. The motor 3 receives supply of electric power from the battery 10 and then performs power running. In addition, the motor 3 supplies the battery 10 with electric power generated from torque outputted by the engine 2 and/or inertia of the vehicle, so as to charge the battery 10. The battery 10 may be another electric storage device including a capacitor, for example.

Figure 2:
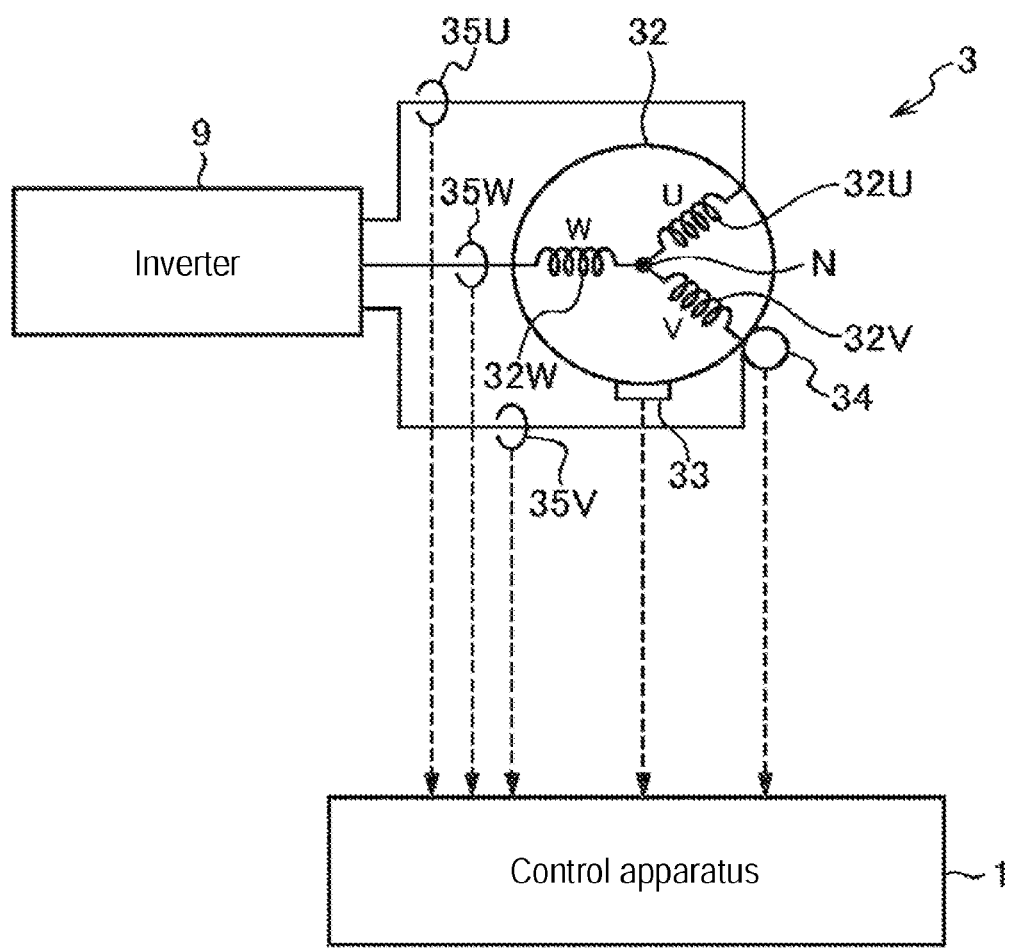
FIG. 2 is a view illustrating a schematic configuration of a motor of the first embodiment.

The motor 3 is a three-phase alternating current motor and includes a rotor 31, a stator 32 and a rotational angle sensor 33 as illustrated in FIG. 1. FIG. 2 is a view illustrating a schematic configuration of the motor of the first embodiment. As illustrated in FIG. 2, the motor 3 further includes a temperature sensor 34 and current sensors 35U, 35V, 35W. The rotor 31 is connected to the second clutch 8 and rotates in response to a magnetic force generated by the stator 32. The stator 32 generates the force to rotate the rotor 31. The stator 32 includes a U-phase coil 32U, a V-phase coil 32V and a W-phase coil 32W. Alternating currents are supplied respectively to the U-phase coil 32U, the V-phase coil 32V and the W-phase coil 32W from the inverter 9 in such a manner that phases of the alternating currents are differ from one another by 120 degrees. Accordingly, the magnetic force for rotating the rotor 31 can be generated.

The rotational angle sensor 33 detects a rotational angle of the rotor 31 and outputs a rotational angle signal which indicates the detected rotational angle to the control apparatus 1. The temperature sensor 34 is an example of a coil temperature detection portion and is provided in the vicinity of the V-phase coil 32V, for example. As a coil sensor temperature, the temperature sensor 34 detects temperature of a coil of a specific phase (the V-phase as an example) out of the three phase coils, and outputs a coil sensor temperature signal which indicates the detected coil sensor temperature to the control apparatus 1. The current sensors 35U, 35V and 35W detect currents flowing to the U-phase coil 32U, the V-phase coil 32V and the W-phase coil 32W, respectively, and output electric current signals indicating the respective detected currents to the control portion.

Figure 3:
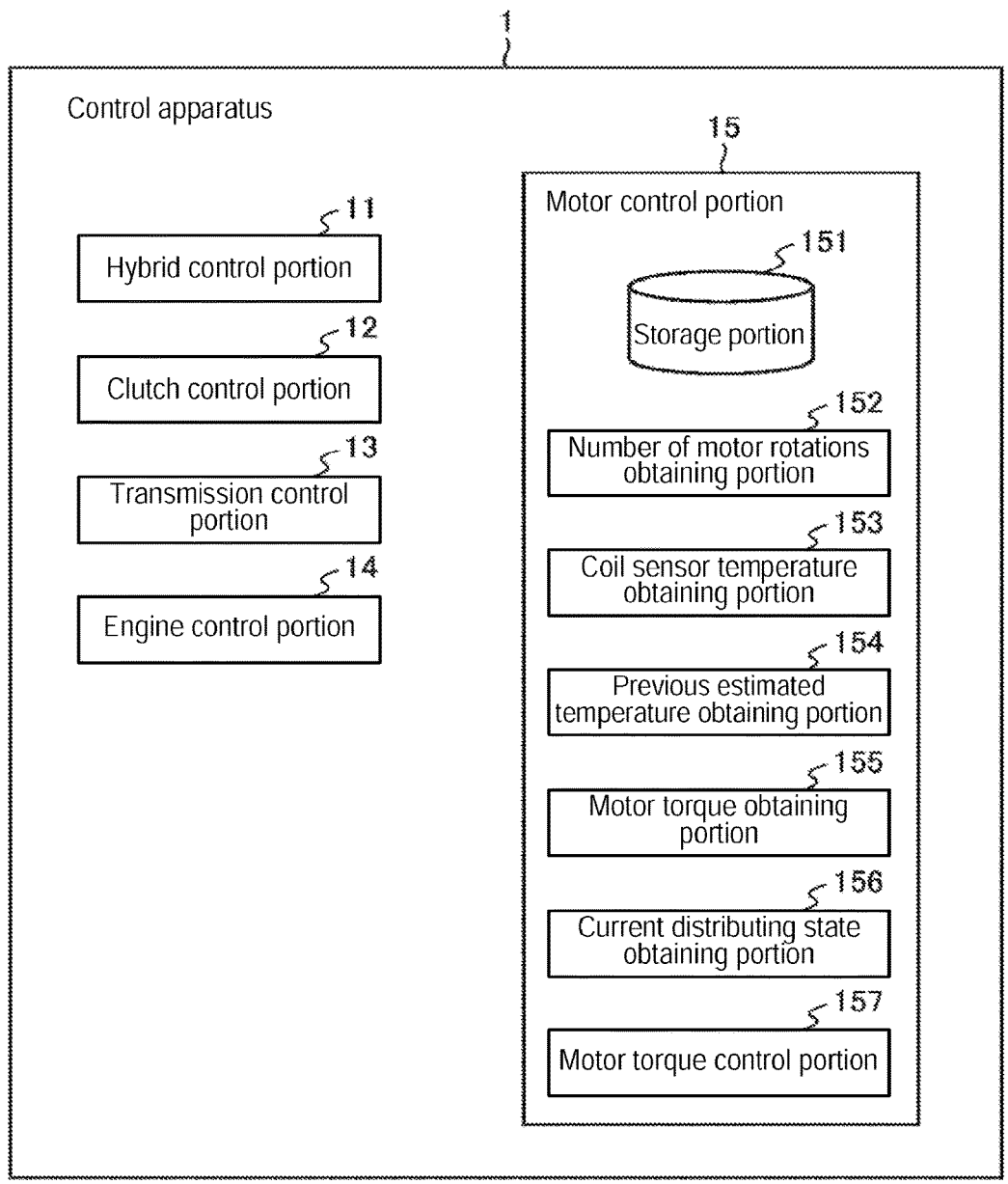
FIG. 3 is a block diagram illustrating a schematic configuration of a control apparatus related to the first embodiment.

The control apparatus 1 controls, for example, the engine 2, the motor 3, the clutch 5, the automatic transmission 6 and the inverter 9. A schematic configuration of the control apparatus 1 related to the first embodiment will be described with reference to FIG. 3. FIG. 3 is a block diagram illustrating the schematic configuration of the control apparatus 1 related to the first embodiment. As illustrated in FIG. 3, the control apparatus 1 includes a hybrid control portion 11 controlling the whole of the vehicle M, a clutch control portion 12 controlling the clutch 5, a transmission control portion 13 controlling the automatic transmission 6, an engine control portion 14 controlling the engine 2, and a motor control portion 15 controlling the motor 3, the inverter 9 and the battery 10.

The hybrid control portion 11 calculates a driver request torque, which is requested by a driver, on the basis of an accelerator opening degree based on operation of an accelerator pedal (not shown) performed by the driver. The hybrid control portion 11 calculates a requested motor torque on the basis of the driver request torque and information including a charging status of the battery 10 and/or speed of the vehicle M, and outputs the requested motor torque to the motor control portion 15. The requested motor torque is a torque that the motor 3 is requested to output. Then, the hybrid control portion 11 subtracts the requested motor torque from the driver request torque to calculate a requested engine torque, and outputs the requested engine torque to the engine control portion 14. The requested engine torque is a torque that the engine 2 is requested to output. The engine control portion 14 controls the number of rotations of the engine 2 and torque of the engine 2 in accordance with the requested engine torque.

In a case where the hybrid control portion 11 determines that a gearshift line presenting a relation between a throttle valve opening degree and a vehicle speed is exceeded with the use of the throttle valve opening degree and the vehicle speed, or in a case where the driver operates a shift lever that is not shown, the hybrid control portion 11 outputs "a gearshift request", which requests a change of a gearshift stage, to the transmission control portion 13. In response to the gearshift request, the transmission control portion 13 changes the gearshift stages.

The clutch control portion 12 includes a function of controlling disconnection and connection of the clutch 5. For example, in a case where the vehicle 1 comes to be in a stopped state, the clutch control portion 12 sends a clutch disconnection request, which is a request for disconnecting power transmission from the engine 2 and the motor 3 to the wheels 4, to the clutch 5. In response to the clutch disconnection request, the clutch 5 is disconnected. On the other hand, for example, after the number of rotations of the engine 2 increases to a predetermined number of rotations and the number of rotations of the motor 3 increases to a predetermined number of rotations, the clutch control portion 12 sends a clutch connection request, which is a request for enabling power transmission from the engine 2 to the automatic transmission 6, to the clutch 5. In response to the clutch connection request, the clutch 5 is engaged.

The motor control portion 15 controls the motor 3 in accordance with the requested motor torque inputted from the hybrid control portion 11. The motor control portion 15 includes a storage portion 151, a number of motor rotations obtaining portion 152, a coil sensor temperature obtaining portion 153, a previous estimated temperature obtaining portion 154, a motor torque obtaining portion 155, a current distributing state obtaining portion 156 and a motor torque control portion 157.

In the storage portion 151, initial values of motor temperatures of the respective phases are stored. In addition, at the storage portion 151, every time when an estimated temperature of the coil of each phase is decided by the motor torque control portion 157, the previous estimated temperature of each phase is updated with the estimated temperature of the corresponding coil which has been decided, and previous estimated temperature information of the respective phases which is stored at the storage portion 151 is updated with the updated previous estimated temperatures of the respective phases. The number of motor rotations obtaining portion 152 decides the number of rotations of the motor 3 (which will be hereinafter referred to as the number of motor rotations) with the use of the rotational angle indicated by the rotational angle signal obtained from the rotational angle sensor 33. Thus, the number of motor rotations obtaining portion 152 obtains information of number of motor rotations which indicates the number of motor rotations. From the coil sensor temperature signal from the temperature sensor 34, the coil sensor temperature obtaining portion 153 obtains coil sensor temperature information which indicates the coil sensor temperature.

The previous estimated temperature obtaining portion 154 reads out the previous estimated temperature information, which indicates the previous estimated temperatures, from the storage portion 151. The motor torque obtaining portion 155 obtains motor torque which the three-phase alternating current motor outputs. As an example thereof, in the present embodiment, the motor torque obtaining portion 155 obtains the requested motor torque inputted from the hybrid control portion 11 as the motor torque which the three-phase alternating current motor outputs. The current distributing state obtaining portion 156 obtains a current distributing state, that is, a state of current distribution, to the three phase coils (that is, the U-phase coil 32U, the V-phase coil 32V and the W-phase coil 32W). As an example thereof, in the present embodiment, an electric angle of the alternating current flowing to each of the three phase coils (that is, the U-phase coil 32U, the V-phase coil 32V and the W-phase coil 32W) of the stator 32 of the three-phase alternating current motor.

The motor torque control portion 157 is an example of the control portion and controls motor torque outputted by the motor 3. For example, the motor torque control portion 157 determines whether or not the motor 3 serving as the three-phase alternating current motor is in a motor lock state. In a case where the motor 3 is in the motor lock state, the motor torque control portion 157 controls the motor torque at least with the use of other phase estimated temperatures which are estimated temperatures of other phase coils other than a specific phase coil included in the coils of the three phases. Here, an example of the motor lock state of the present embodiment is a case in which the number of motor rotations is equal to or less than a threshold number of rotations even though the motor torque (the requested motor torque, for example) is equal to or more than a threshold torque. In this state, the number of motor rotations is small in spite of the large motor torque, and the rotor 31 of the motor does not rotate much even though the driver presses on the accelerator pedal. For example, the motor torque control portion 157 updates each of the other phase estimated temperatures with the use of the coil sensor temperature and an added-up value of a temperature rise per unit time of each of the other phase coils at each point of time from the previous obtainment of the other phase estimated temperature to the present time. Here, the temperature rise per unit time of each of the other phase coils at each time point is decided by the motor torque control portion 157 in accordance with a combination of the motor torque and the current distributing state at each time point.

Figure 4:
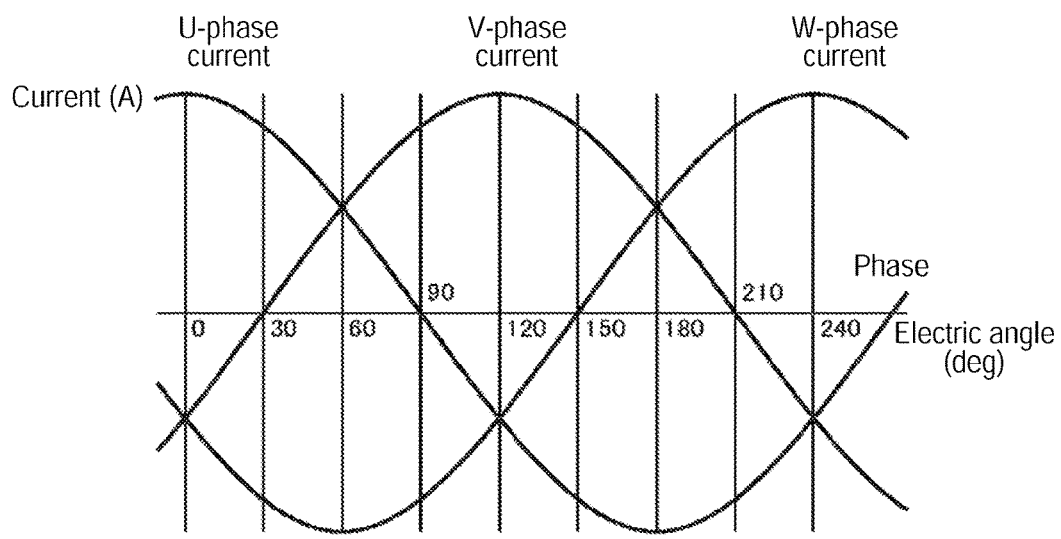
FIG. 4 is a graph showing a relation between amplitude and an electric angle of an alternating current supplied to a coil of each phase.

FIG. 4 is a graph showing a relation between amplitude and the electric angle of the alternating current supplied to the coil of each phase. In the graph of FIG. 4, in a case where the motor is controlled under a sine wave PWM (Pulse Width Modulation) control, waveforms of the alternating currents flowing to the coils of the U-phase, the V-phase and the W-phase (which will be hereinafter referred to as a U-phase current, a V-phase current and a W-phase current, respectively) are indicated in an overlapped manner with one another. The horizontal axis indicates an electric angle (deg) that can represent a phase of current. The vertical axis indicates a current amplitude (A) and corresponds to a linear line at which the current amplitude of the horizontal axis is zero. As shown in FIG. 4, where a cycle of the waveform is 360 degrees, the phases of the currents of the coils of the respective phases differ from one another by 120 degrees.

Figure 5:
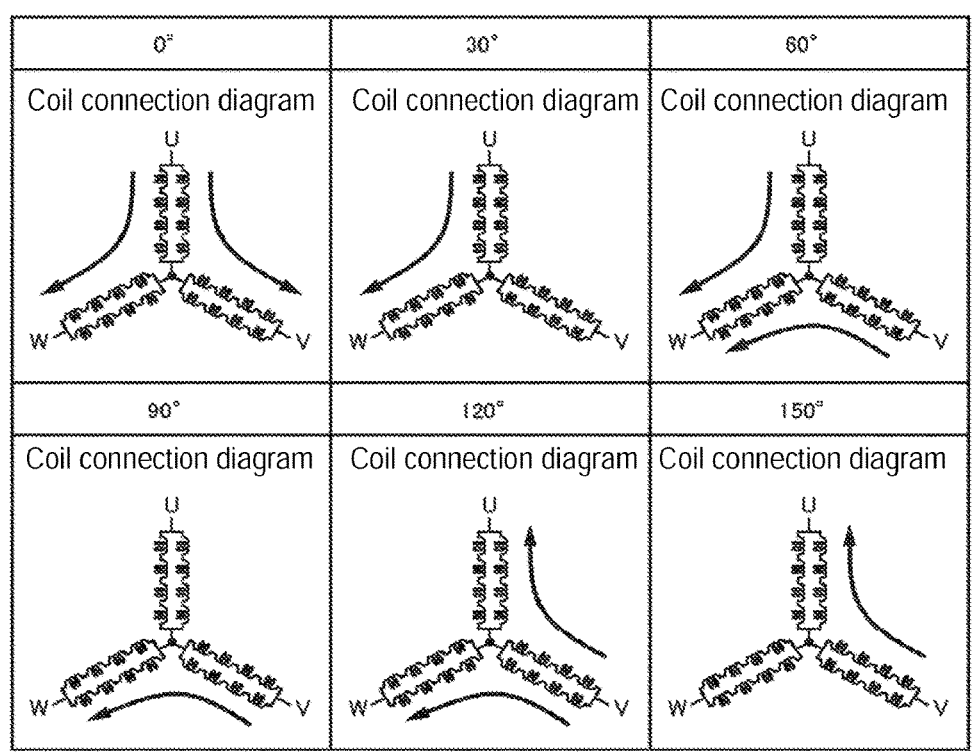
FIG. 5 is a diagram illustrating energization patterns for the respective electric angles.

FIG. 5 is a diagram illustrating energization patterns for the respective electric angles. In each of coil connection diagrams illustrated in FIG. 5, the alternating current flows in a direction of the arrow. Thus, the currents flowing to the respective phases differ depending on each electric angle, and accordingly amounts of heat generation in the respective phases differ from one another, and consequently the temperature rises in the respective phases differ from one another. In the present embodiment, as an example, a table is stored in the storage portion 151 for each of the electric angles at predetermined intervals and for each phase (for each of the U-phase, the V-phase and the W-phase). The table stores therein combinations of data of the motor torque and data of the temperature rises per unit time. For example, however, at each electric angle, in a case where any two of the tables for the U-phase, the V-phase and the W-phase are common to each other, only one of the common tables is stored. For example, when the electric angle is 0 degree, the table for the V-phase and the table for the W-phase are same as each other. Therefore, at the electric angle of 0 degree, the table that is common to the V-phase and the W-phase, and the table for the U-phase are stored. In this case, the motor torque control portion 157 refers to the tables for the U-phase, the V-phase and the W-phase which correspond to the electric angles at each time point, and accordingly the motor torque control portion 157 can obtain the temperature rise per unit time of the U-phase coil, the temperature rise per unit time of the V-phase coil and the temperature rise per unit time of the W-phase coil, from the electric angles and the motor torques at each point of time.

Figure 6:
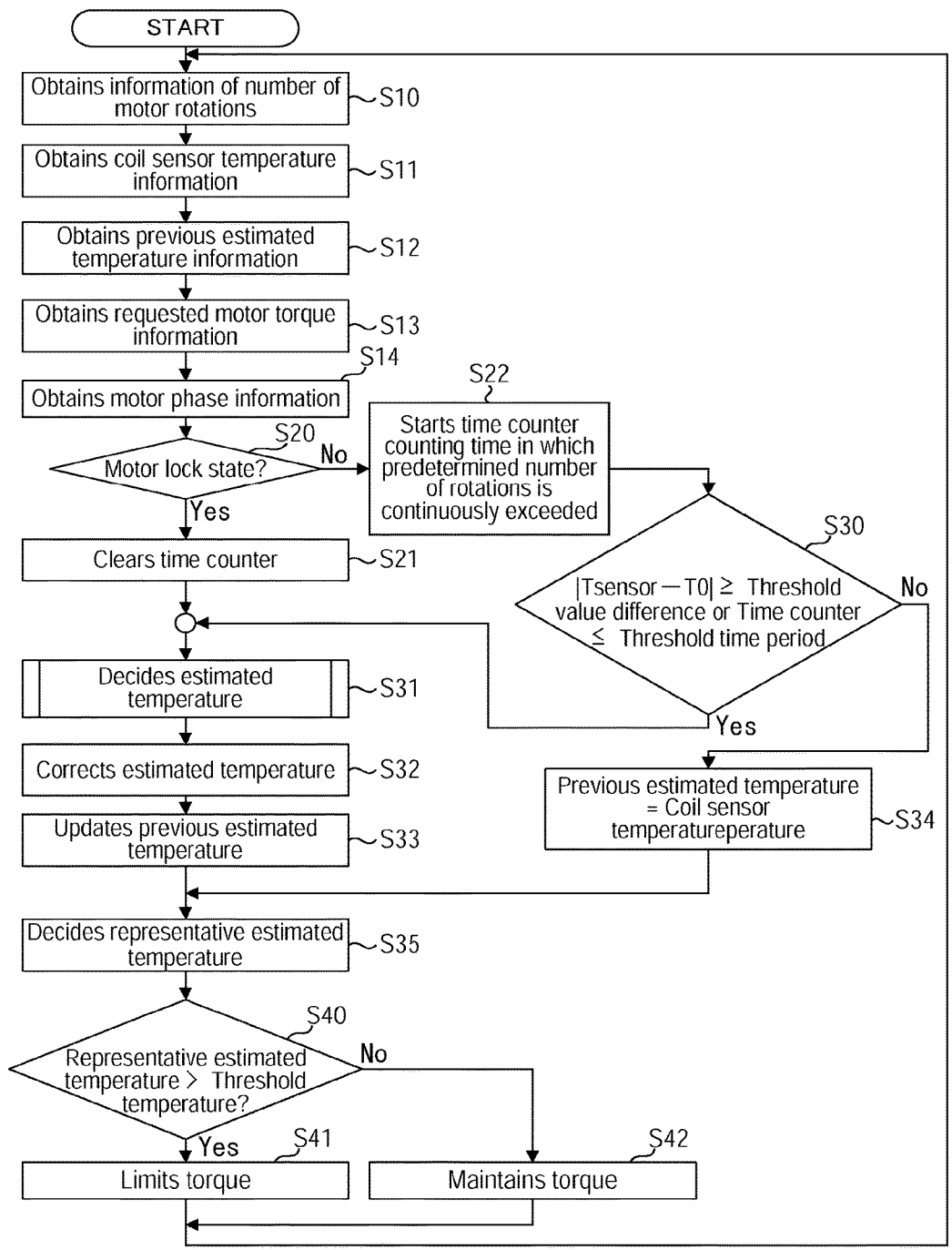
FIG. 6 is a flowchart illustrating an example of a control process of a motor control of the first embodiment.

An operation of the control system for the vehicle drive motor, which includes the above-described configuration, will be described with reference to FIG. 6. FIG. 6 is a flowchart illustrating an example of a control process of a motor control of the first embodiment.

(Step S10) First, the number of motor rotations obtaining portion 152 of the motor control portion 15 obtains the information of number of motor rotations.

(Step S11) Next, the coil sensor temperature obtaining portion 153 of the motor control portion 15 obtains the coil sensor temperature information. The coil sensor temperature information indicates a coil sensor temperature Tsensor.

(Step S12) Next, the previous estimated temperature obtaining portion 154 of the motor control portion 15 obtains the previous estimated temperature information. Here, the previous estimated temperature information includes a previous estimated temperature T0$u$ of the U-phase, a previous estimated temperature T0$v$ of the V-phase, a previous estimated temperature T0$w$ of the W-phase and a previous representative estimated temperature T0. In the present embodiment, as an example, the previous representative estimated temperature T0 is the largest value of the previous estimated temperature T0$u$ of the U-phase, the previous estimated temperature T0$v$ of the V-phase and the previous estimated temperature T0$w$ of the W-phase. The previous representative estimated temperature T0 is not limited to the largest value of the previous estimated temperature T0$u$ of the U-phase, the previous estimated temperature T0$v$ of the V-phase and the previous estimated temperature T0$w$ of the W-phase, and may be a representative value representing the previous estimated temperature T0$u$ of the U-phase, the previous estimated temperature T0$v$ of the V-phase and the previous estimated temperature T0$w$ of the W-phase, including the median value, the average value and/or the smallest value, for example.

(Step S13) Next, the motor torque obtaining portion 155 obtains requested motor torque information. The requested motor torque information indicates the requested motor torque.

(Step S14) Next, the current distributing state obtaining portion 156 obtains motor phase information. The motor phase information indicates the electric angle representing the phase of the current. Here, the electric angle may be decided according to the electric current of each phase which is indicated by the electric current signal obtained by the current sensor 35U, 35V, 35W, or according to the rotational angle obtained from the rotational angle sensor 33.

The process described thereafter is executed by the motor torque obtaining portion 155 of the motor control portion 15.

(Step S20) The motor torque control portion 157 determines whether or not the motor lock state is established by using at least one of the motor torque and the number of motor rotations. In the present embodiment, as an example, the motor torque control portion 157 determines whether or not the motor torque (here, the requested motor torque, as an example) is equal to or more than the threshold torque and the number of motor rotations is equal to or less than the threshold number of rotations. If the number of motor rotations is equal to or less than the threshold number of rotations and the motor torque is equal to or more than the threshold torque, the motor torque control portion 157 determines that the motor lock state is established because the number of motor rotations is small even though the motor torque is large. Then, the process moves to Step S21. On the other hand, if the number of motor rotations is not equal to or less than the threshold number of rotations, or the motor torque is not equal to or more than the threshold torque, the motor torque control portion 157 determines that the motor lock state is not established. Then, the process moves to Step S22.

Hereafter, the explanation will be made on the presumption that it is determined at Step S20 that the motor lock state exists, that is, the motor lock state is established.

(Step S21) In a case where it is determined at Step S20 that the motor lock state is established, the motor torque control portion 157 clears a time counter (that is, the time counter is made zero) which counts time period in which the predetermined number of rotations is continuously exceeded.

(Step 31) Then, at each time point from a time when the previous estimated temperature T0$u$ of the U-phase was previously obtained to the present time, the motor torque control portion 157 refers to the table and obtains the temperature rise per unit time of the U-phase coil 32U which corresponds to the combination of the motor torque and the electric angle at the corresponding time point. Then, the motor torque control portion 157 adds up the obtained temperature rises and decides an added-up value T1$u$ of the U-phase. Thus, the temperature rise of the U-phase coil 32U per unit time at each time point is decided according to the combination of the motor torque and the current distributing state at the corresponding time point. Accordingly, by adding up the temperature rises of the U-phase coil 32U per unit time, an estimation accuracy of the temperature of the U-phase coil 32U can be increased. In a similar manner, at each time point from a time when the previous estimated temperature T0$v$ of the V-phase was previously obtained to the present time, the motor torque control portion 157 refers to the table and obtains the temperature rise per unit time of the V-phase coil 32V which corresponds to the combination of the motor torque and the electric angle at the corresponding time point. Then, the motor torque control portion 157 adds up the obtained temperature rises and decides an added-up value T1$v$ of the V-phase. Thus, the temperature rise of the V-phase coil 32V per unit time at each time point is decided according to the combination of the motor torque and the current distributing state at the corresponding time point. Accordingly, by adding up the temperature rises of the V-phase coil 32V per unit time, an estimation accuracy of the temperature of the V-phase coil 32V can be increased. In a similar manner, at each time point from a time when the previous estimated temperature T0$w$ of the W-phase was previously obtained to the present time, the motor torque control portion 157 refers to the table and obtains the temperature rise of the W-phase coil 32W per unit time which corresponds to the combination of the motor torque and the electric angle at the time point. Then, the motor torque control portion 157 adds up the obtained temperature rises and decides an added-up value T1$w$ of the W-phase. Accordingly, the temperature rise of the W-phase coil 32W per unit time at each time point is decided according to the combination of the motor torque and the current distributing state at the corresponding time point. Consequently, by adding up the temperature rises of the W-phase coil 32W per unit time, an estimation accuracy of the temperature of the W-phase coil 32W can be increased. Then, the motor torque control portion 157 determines a sum of the previous estimated temperature T0$u$ of the U-phase and the added-up value T1$u$ of the U-phase as an estimated temperature T2$u$ of the U-phase (T2$u$=T0$u$+T1$u$). In a similar manner, the motor torque control portion 157 determines a sum of the previous estimated temperature T0$v$ of the V-phase and the added-up value T1$v$ of the V-phase as an estimated temperature T2$v$ of the V-phase (T2$v$=T0$v$+T1$v$). In a similar manner, the motor torque control portion 157 determines a sum of the previous estimated temperature T0$w$ of the W-phase and the added-up value T1$w$ of the W-phase as an estimated temperature T2$w$ of the W-phase (T2$w$=T0$w$+T1$w$).

(Step 32) Next, the motor torque control portion 157 decides the coil sensor temperature Tsensor as a corrected estimated temperature T3$v$ of the V-phase because, as an example in the present embodiment, the temperature sensor 34 detects the temperature of the V-phase coil 32V as the coil sensor temperature. The motor torque control portion 157 determines a temperature obtained by subtracting a difference between the estimated temperature T2$v$ of the V-phase and the coil sensor temperature Tsensor (T2$v$−Tsensor) from the estimated temperature $T2u$ of the U-phase, as a corrected estimated temperature $T3u$ of the U-phase ($T3u=T2u-(T2v-Tsensor)$). In a similar manner, the motor torque control portion 157 decides a temperature obtained by subtracting the difference between the estimated temperature $T2v$ of the V-phase and the coil sensor temperature Tsensor ($T2v-Tsensor$) from the estimated temperature $T2w$ of the W-phase, as a corrected estimated temperature $T3w$ of the W-phase ($T3w=T2w-(T2v-Tsensor)$).

As described above, the motor torque control portion 157 corrects the updated other phase estimated temperatures by using a comparison result between the estimated temperature of the specific phase (here, the estimated temperature $T2v$ of the V-phase) and the coil sensor temperature Tsensor. Accordingly, the other phase estimated temperatures which are updated can be corrected with the use of the comparison result between the estimated temperature of the specific phase and the actual temperature of the specific temperature, thereby improving an accuracy of the updated other phase estimated temperatures.

(Step 33) Subsequently, the motor torque control portion 157 updates the previous estimated temperature $T0u$ of the U-phase with the corrected estimated temperature $T3u$ of the U-phase. In a similar manner, the motor torque control portion 157 updates the previous estimated temperature $T0v$ of the V-phase with the corrected estimated temperature $T3v$ of the V-phase. In a similar manner, the motor torque control portion 157 updates the previous estimated temperature $T0w$ of the W-phase with the corrected estimated temperature $T3w$ of the W-phase.

(Step 35) Next, the motor torque control portion 157 determines the largest value a representative estimated temperature $T4$, the largest value which is from among the previous estimated temperature $T0u$ of the U-phase, the previous estimated temperature $T0v$ of the V-phase, the previous estimated temperature $T0w$ of the W-phase and the coil sensor temperature Tsensor.

(Step 40) Next, the motor torque control portion 157 determines whether or not the representative estimated temperature $T4$ is higher than a threshold temperature Tth.

(Step 41) In a case where it is determined at Step S40 that the representative estimated temperature $T4$ is higher than the threshold temperature Tth (Step S40 YES), the motor torque control portion 157 controls the motor 3 such that the motor torque is reduced. For example, the threshold temperature Tth is a temperature obtained by subtracting a predetermined margin temperature from a heat allowable limit temperature Tmax of the coil. Thus, by causing the motor torque to be reduced in a case where the representative estimated temperature $T4$ decided by using the other phase estimated temperatures is higher than the threshold temperature Tth, the temperatures of the other phase coils also can be prevented from exceeding the heat allowable limit temperature even if the motor torque fluctuates and/or the current distributing state relative to the coils of the respective phases changes. In consequence, a negative or adverse influence caused by the heat can be avoided from occurring to the other phase coils.

As described above, the motor torque control portion 157 determines whether or not the representative estimated temperature $T4$ decided by using the other phase estimated temperatures exceeds the threshold temperature Tth. In a case where the representative estimated temperature $T4$ exceeds the threshold temperature Tth, the motor torque control portion 157 limits the motor torque. By adding up the temperature rises per unit time of the respective other phase coils which are decided according to the combinations of the motor torque and the current distributing state at each time point, the estimation accuracy of the other phase estimated temperatures can be improved. Then, by making the motor torque to reduce in a case where the representative estimated temperature $T4$ decided with the use of the other phase estimated temperatures is higher than the threshold temperature Tth, the temperatures of the other phase coils can be prevented from exceeding the heat permissible limit temperature even if the motor torque varies and/or the state of electric current distribution to each phase varies.

(Step S42) In a case it is determined at Step S40 that the representative estimated temperature $T4$ is equal to or less than the threshold temperature Tth (Step S40 NO), the motor torque control portion 157 controls the motor 3 such that the motor torque is maintained. Accordingly, the motor torque can be maintained by continuous energization until the representative estimated temperature $T4$ approaches the heat allowable limit temperature, thereby preventing as much as possible a torque drop or a torque loss which the driver does not intend.

Subsequently, the explanation will be made hereunder for a case in which it is determined at Step S20 that the motor lock is not established.

(Step S22) In a case where it is determined at Step S20 that the motor lock state is not established, the motor torque control portion 157 starts the above-explained time counter that counts the time in which the predetermined number of rotations is continuously exceeded. The process moves to Step S30.

(Step S30) At Step S30, the motor torque control portion 157 determines whether or not a not-return condition is satisfied, in order to determine that the motor lock state has not returned to a normal state. For example, the not-return condition related to the present embodiment is that a difference between the coil sensor temperature Tsensor and the previous representative estimated temperature T0 is equal to or more than a threshold difference value Y and the time counter is equal to or less than a threshold time period Z. In a case where the not-return condition is satisfied, a divergence exists between the temperatures of the other phase coils and the coil sensor temperature. Thus, the process moves to Step S31 and the estimated temperature is decided. Then, at Step S40, determination is performed on whether or not the representative estimated temperature decided with the use of the two other phase estimated temperatures and the coil sensor temperature is higher than the threshold temperature. On the other hand, in a case where the not-return condition is not satisfied, a slight divergence exists between each of the coil temperatures and the coil sensor temperature, and thus the process moves to Step S34. At Step S40, determination is performed on whether or not the coil sensor temperature is higher than the threshold temperature.

Specifically, for example, at Step S30, the motor torque control portion 157 determines whether or not the difference between the coil sensor temperature Tsensor and the previous representative estimated temperature T0 is equal to or more than the threshold difference value Y or whether or not the time counter is equal to or less than the threshold time period Z. In a case where the difference between the coil sensor temperature Tsensor and the previous representative estimated temperature T0 is equal to or more than the threshold difference value Y, the divergence still exists between the temperatures of the other phase coils and the coil sensor temperature Tsensor. Therefore, the motor torque control portion 157 moves to Step S31 and decides the estimated temperature as described above, in order to perform the determination by using the representative estimated temperature based on the corrected estimated temperature at Step S40. Also in a case where the time counter is equal to or less than the threshold time Z, the rotor 31 is at the beginning of rotations after the motor lock state, and thus the divergence still exists between the temperatures of the other phase coils and the coil sensor temperature Tsensor. Therefore, the motor torque control portion 157 moves to Step S31 and decides the estimated temperature as described above, in order to perform the determination by using the representative estimated temperature based on the corrected estimated temperature at Step S40.

As described above, the motor torque control portion 157 determines whether or not the difference between the previous representative estimated temperature, which is decided on the basis of the previously updated other phase estimated temperatures, and the coil sensor temperature exceeds the threshold value, or whether or not the time period for which the number of rotations of the motor 3 consecutively exceeds the predetermined number of rotations is equal to or less than the threshold time period. In a case where it is determined that the threshold value is exceeded or the time period is equal to or less than the threshold time period, the motor torque control portion 157 at least updates the other phase estimated temperatures. Accordingly, when the divergence exists between the coil sensor temperature and the temperatures of the other phase coils, or when the motor lock state is released and the rotations have just started, the motor torque control portion 157 updates the other phase estimated temperatures and controls the motor torque in accordance with the updated other phase estimated temperatures. Thus, in the course of the return from the motor lock state to the normal state, the motor torque is controlled with the use of the other phase estimated temperatures including the high estimation accuracy. Consequently, the motor torque can be controlled before the other phase estimated temperatures exceed the heat allowable limit temperatures of the other phase coils. In consequence, because the motor torque decreases, the temperatures of the other phase coils can be prevented from exceeding the heat allowable limit temperature, thereby preventing the negative influence due to the heat from occurring to the other phase coils. On the other hand, the motor torque can be maintained until the other phase estimated temperatures approach the heat allowable limit temperatures of the other phase coils. As a result, the motor toque can be maintained until the heat allowable limit temperatures is approached, thereby to prevent as much as possible the torque drop which the driver does not intend.

On the other hand, in a case where the difference between the coil sensor temperature Tsensor and the previous representative estimated temperature T0 does not exceed the threshold difference value Y at Step S30, it can be estimated that not much divergence exists between the temperatures of the other phase coils and the coil sensor temperature Tsensor, and therefore the motor torque control portion 157 moves the process to Step S34. Also in a case where the time counter is not equal to or less than the threshold time period Z at Step S30, time has passed since the rotor 31 started to rotate after the motor lock state. Thus, it can be estimated that not much divergence exists between the temperatures of the other phase coils and the coil sensor temperature Tsensor, and accordingly the motor torque control portion 157 moves to Step S34.

In these cases, at Step S34, the motor torque control portion 157 determines all of the previous estimated temperature T0$u$ of the U-phase, the previous estimated temperature T0$v$ of the V-phase and the previous estimated temperature T0$w$ of the W-phase as the coil sensor temperature Tsensor (T0$u$=T0$v$=T0$w$=Tsensor), and the process moves to Step S35. Then, at Step S35, the motor torque control portion 157 determines the representative estimated temperature T4 as the coil sensor temperature Tsensor. At Step S40, the motor torque control portion 157 determines whether or not the representative estimated temperature T4 is higher than the threshold temperature Tth. In a case where it is determined at Step S40 that the representative estimated temperature T4 is higher than the threshold temperature Tth (Step S40 YES), the motor torque control portion 157 controls the motor 3 such that the motor torque is reduced. Because the motor torque reduces accordingly, the temperature of the coil of any phase does not exceed the heat allowable limit temperature.

On the other hand, in a case where it is determined at Step S40 that the representative estimated temperature T4 is equal to or less than the threshold temperature Tth (Step S40 NO), the motor torque control portion 157 controls the motor 3 such that the motor torque is maintained. Accordingly, the motor torque can be maintained until the temperature of the coil of any phase approaches or comes close to the heat allowable limit temperature, thereby preventing as much as possible the occurrence of the torque drop which the driver does not intend.

At Step S40 of FIG. 6, it is determined whether or not the representative estimated temperature exceeds the threshold determination temperature, however, it is not limited thereto, and it may be determined whether or not other phase estimated temperatures or the coil sensor temperature exceeds the threshold determination temperature.

As described above, at the control system 100 for the vehicle drive motor related to the first embodiment, the motor torque obtaining portion 155 obtains the motor torque that the motor 3 serving as the three-phase alternating current motor outputs. The current distributing state obtaining portion 156 obtains the distributing state of the electric current to the coils of the respective phases of the stator 32 of the motor 3. The temperature sensor 34 detects the temperature of the specific phase coil from among the three phase coils as the coil sensor temperature. The motor torque control portion 157 updates the other phase estimated temperatures serving as the estimated temperatures of the other phase coils by using the coil sensor temperature and the added-up value of the temperature rises per unit time of the other phase coils at each point of time. The motor torque control portion 157 controls the motor torque at least by using the other phase estimated temperatures. Here, the temperature rises of each of the other phase coils per unit time at each point of time are decided by the motor torque control portion 157 in accordance with the respective combinations of the motor torque and the current distributing state at each point of time.

Since the temperature rises of each the other phase coils per unit time at respective time points are decided in accordance with the combinations of the motor torque and the current distributing state at the respective time points, the estimation accuracy of the other phase estimated temperatures which are decided with the use of the added-up values of the temperature rises of the other phase coils per unit time at each point of time can be increased. Thus, the motor torque is controlled with the use of the other phase estimated temperatures with the high estimation accuracy, and accordingly the motor torque can be limited before the other phase estimated temperatures exceed the heat allowable limit temperatures of the other phase coils. As a result, the moor torque decreases, which also prevents the temperatures of the other phase coils from exceeding the heat allowable limit temperatures. Consequently, the adverse effects can be prevented from occurring at the other phase coils due to the heat. On the other hand, the motor torque can be maintained until the other phase estimated temperatures approach the heat allowable limit temperatures of the other phase coils. As a result, the motor torque can be maintained until the heat allowable limit temperatures are approached, thereby preventing the torque drop unintended by the driver as much as possible.

Second Embodiment

Subsequently, a second embodiment will be described. In the first embodiment, the motor torque is maintained in a case where the representative estimated temperature T4 is equal to or less than the threshold temperature Tth. Contrary to this, in the second embodiment, in a case where the representative estimated temperature T4 is equal to or less than the threshold temperature Tth, the limit on the motor toque is relaxed or alleviated in accordance with an elapsed time from a time when the most recent motor lock state is released. A configuration of the control system 100 for the vehicle drive motor related to the second embodiment is the same as the configuration of the control system 100 for the vehicle drive motor related to the first embodiment, and therefore the explanation thereof will be omitted.

Figure 7:
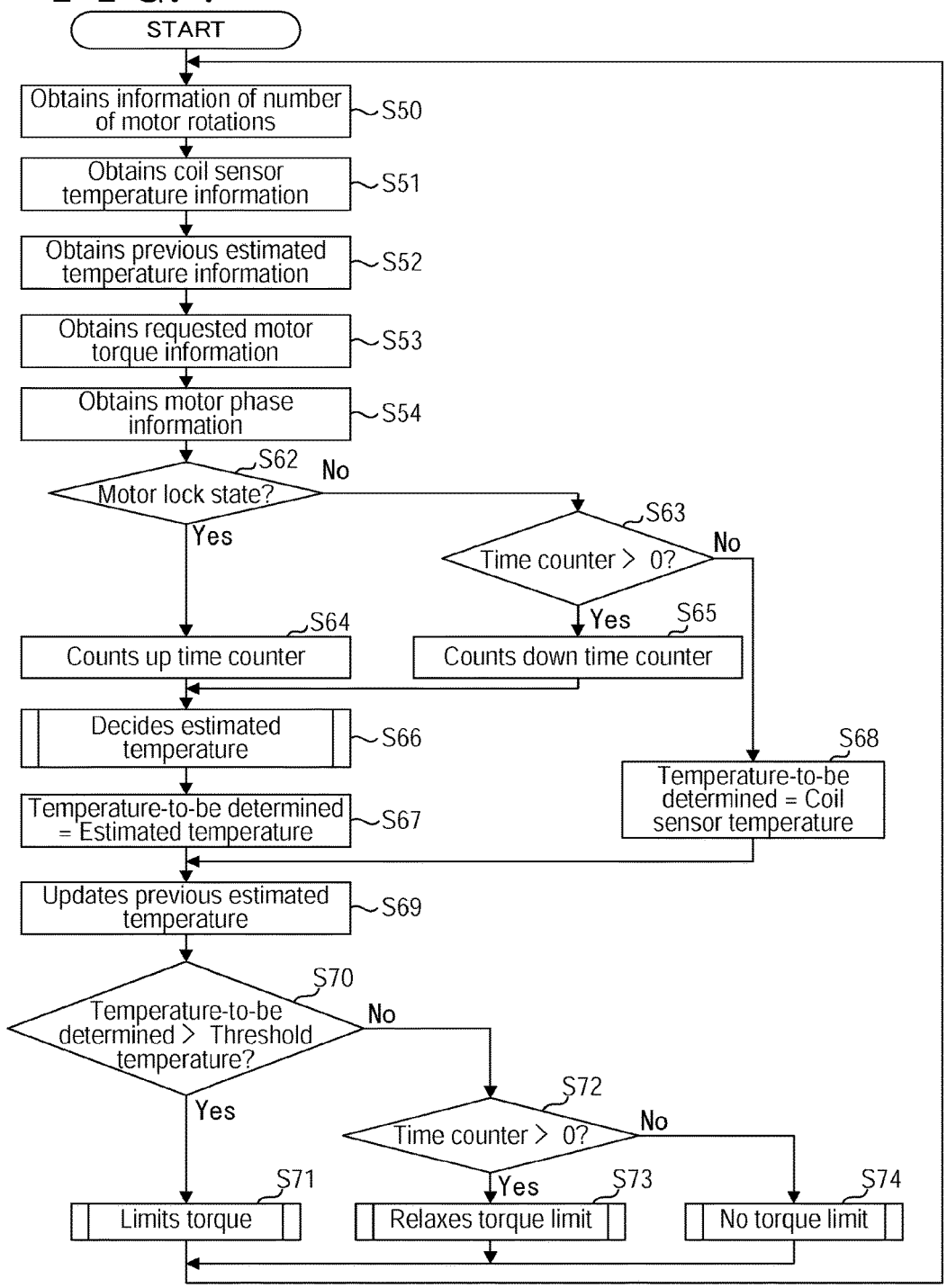
FIG. 7 is a flowchart illustrating an example of a control process of a motor control of a second embodiment.

Subsequently, an operation of the motor control in the second embodiment will be described with reference to FIG. 7. FIG. 7 is a flowchart illustrating an example of a control process of the motor control of the second embodiment. Because Steps S50 to S54 are identical to the Steps S10 to S14 of FIG. 6, the explanation of Steps S50 to S54 will be omitted.

(Step S62) In a similar manner to Step S20 of FIG. 6, the motor torque control portion 157 determines whether or not the motor lock state is established. Specifically, for example, the motor torque control portion 157 determines whether or not the motor lock state is established. Specifically, for example, the motor torque control portion 157 determines whether or not the motor torque (here, the requested motor torque as an example) is equal to or more than the threshold torque and the number of motor rotations is equal to or less than the threshold number of rotations. If the number of motor rotations is equal to or less than the threshold number of rotations and the motor torque is equal to or more than the threshold torque, the motor torque control portion 157 determines that the motor lock state is established because the number of motor rotations is small even though the motor torque is large. Then, the process moves to Step S64. On the other hand, if the number of motor rotations is not equal to or less than the threshold number of rotations, or the motor torque is not equal to or more than the threshold torque, the motor torque control portion 157 determines that the motor lock state is not established. Then, the process moves to Step S63.

Hereafter, the explanation will be made on the presumption that it is determined at Step S62 that the motor lock state is established.

(Step S64) In a case where it is determined at Step S62 that the motor lock state is established, the motor torque control portion 157 counts up the time counter. By doing in this manner, a value of the time counter can be a cycle number at which the motor lock state is maintained, and accordingly the value of the time counter comes to mean a duration time of the motor lock.

(Step S64) Then, in a similar manner to Step S31 of FIG. 6, at each time point from the previous obtainment of the previous estimated temperature T0u of the U-phase to the present time, the motor torque control portion 157 obtains the temperature rise per unit time of the U-phase coil 32U which corresponds to the combination of the motor torque and the electric angle at the time point, by referring to the table. Then, the motor torque control portion 157 adds up the obtained temperature rises and decides the added-up value T1u of the U-phase. In a similar manner, at each time point from the previous obtainment of the previous estimated temperature T0v of the V-phase to the present time, the motor torque control portion 157 obtains the temperature rise per unit time of the V-phase coil 32V which corresponds to the combination of the motor torque and the electric angle at the time point, by referring to the table. Then, the motor torque control portion 157 adds up the obtained temperature rises and decides the added-up value T1v of the U-phase. In a similar manner, at each time point from the previous obtainment of the previous estimated temperature T0w of the W-phase to the present time, the motor torque control portion 157 obtains the temperature rise per unit time of the V-phase coil 32W which corresponds to the combination of the motor torque and the electric angle at the time point, by referring to the table. Then, the motor torque control portion 157 adds up the obtained temperature rises and decides the added-up value T1w of the W-phase. Then, the motor torque control portion 157 determines the sum of the previous estimated temperature T0u of the U-phase and the added-up value T1u of the U-phase as the estimated temperature T2u of the U-phase (T2u=T0u+T1u). In a similar manner, the motor torque control portion 157 determines the sum of the previous estimated temperature T0v of the V-phase and the added-up value T1v of the V-phase as the estimated temperature T2v of the V-phase (T2v=T0v+T1v). In a similar manner, the motor torque control portion 157 determines the sum of the previous estimated temperature T0w of the W-phase and the added-up value T1w of the W-phase as the estimated temperature T2w of the W-phase (T2w=T0w+T1w).

(Step S66) Next, the motor torque control portion 157 determines the estimated temperature of each phase as a temperature-to-be-determined of the corresponding phase. Accordingly, a temperature-to-be-determined T5u of the U phase (T5u=T2u), a temperature-to-be-determined T5v of the V phase (T5v=T2v) and a temperature-to-be-determined T5w of the W phase (T5w=T2w) are decided.

(Step S69) Next, the motor torque control portion 157 updates the previous estimated temperature T0u of the U-phase with the estimated temperature T2u of the U-phase, updates the previous estimated temperature T0v of the V-phase with the estimated temperature T2v of the V-phase, and updates the previous estimated temperature T0w of the W-phase with the estimated temperature T2w of the W-phase.

(Step S70) Next, the motor torque control portion 157 determines whether or not the temperatures-to-be-determined of all the phases (T5u, T5v, T5w) exceed the threshold temperature Tth.

Figure 8:
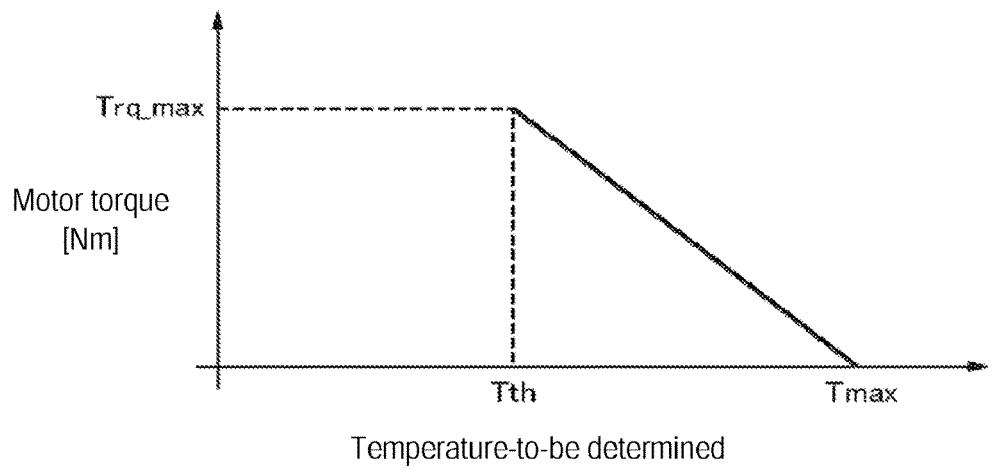
FIG. 8 is a diagram showing an example of a relation between a temperature-to-be determined and motor torque.

(Step S71) In a case where it is determined at Step S70 that the temperatures-to-be-determined of all the phases (T5u, T5v, T5w) exceed the threshold temperature Tth, the motor torque control portion 157 reduces the motor torque in such a manner that, for example, the larger a value obtained by subtracting the threshold temperature Tth from the temperature-to-be-determined of the phase having the highest temperature is, the lower the motor torque is reduced, so that a relation between the temperature-to-be-determined and the motor torque which is shown in FIG. 8 is established. Here, the temperature-to-be-determined of the phase of which the temperature is the highest is an example of the representative estimated temperature representing the estimated temperatures of the three phases. Thus, when the temperature-to-be-determined of the phase of which the temperature is the highest exceeds the threshold temperature Tth, the higher the temperature-to-be-determined becomes, the lower the motor torque is reduced. Accordingly the temperature-to-be-determined of the phase of which the temperature is the highest can be prevented from exceeding the heat allowable limit temperature Tmax of the coil. Consequently, it can be prevented that the negative influence due to the heat occurs to the other phase coils.

FIG. 8 is a diagram showing an example of the relation between the temperature-to-be-determined and the motor torque. As shown in FIG. 8, in a case where the temperature-to-be-determined is the threshold temperature Tth, the motor torque is a maximum motor torque Trq max. In a case where the temperature-to-be-determined exceeds the threshold temperature Tth, the larger the temperature-to-be-determined becomes, the lower the motor torque decreases. When the temperature-to-be-determined is at the heat allowable limit temperature Tmax of the coil, the torque becomes zero.

In the present embodiment, as an example, the larger the value obtained by subtracting the threshold temperature Tth from the temperature-to-be-determined of the phase of which the temperature is the highest is, the lower the motor torque is reduced. However, it is not limited to the temperature-to-be-determined of the phase whose the temperature is the highest, and other representative estimated temperature (for example, the median value, the smallest value or the average value of the estimated temperatures), other phase estimated temperatures or the coil sensor temperature is applicable. That is, in a case where the representative estimated temperature or other phase estimated temperatures exceed the threshold temperature Tth, the motor torque control portion 157 may reduce the motor torque such that, the larger the value obtained by subtracting the threshold temperature from the representative estimated temperature, other phase estimated temperatures or the coil sensor temperature becomes, the lower the motor torque becomes. Beyond the threshold temperature Tth, the higher the representative estimated temperature, other phase estimated temperatures or the coil sensor temperature becomes, the lower the motor torque is reduced. Accordingly, the other phase estimated temperatures can be prevented from exceeding the heat allowable limit temperature Tmax of the coil, thereby preventing the negative influence due to the heat from occurring to the other phase coils.

(Step S72) In a case where it is determined at Step S70 that the temperatures-to-be-determined of all the phases (T5u, T5v, T5w) are equal to or less than the threshold temperature Tth, it is determined whether or not the time counter is larger than 0. Here, the time counter is larger than 0 because the explanation is being made on the presumption that it is determined at Step S62 that the motor lock state is established, and therefore the process moves to Step S73. Then, at Step S73, the motor torque control portion 157 relaxes the limit placed on the motor torque in accordance with a relation between the time counter and a relaxation degree of the torque limit which is shown in FIG. 9, for example.

Figure 9:
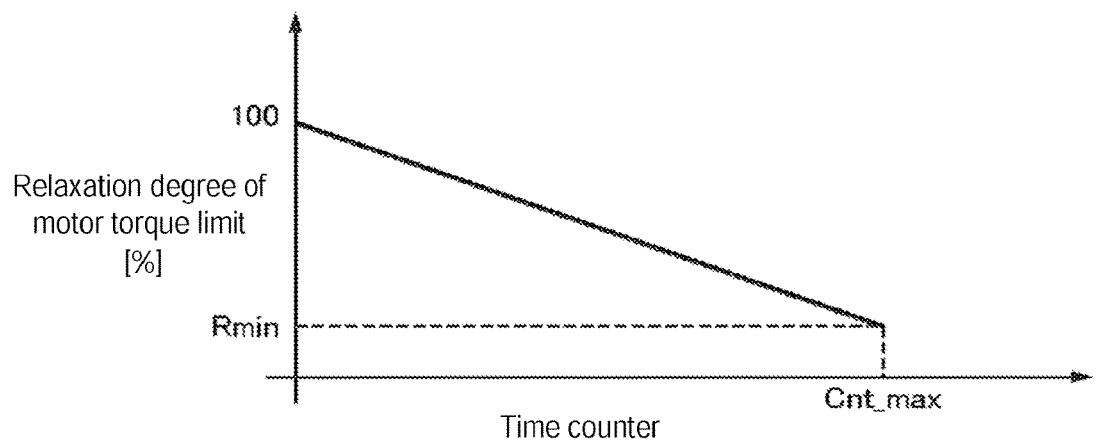
FIG. 9 is a diagram showing an example of a relation between a time counter and a relaxation degree of torque limit.

FIG. 9 is a diagram showing an example of the relation between the time counter and the relaxation degree of the torque limit. In a case where the time counter is 0, the relaxation degree of the torque limit is 100%, and therefore the motor torque is not limited. The larger the time counter becomes, the lower the relaxation degree of the torque limit becomes, and the limit of the motor torque increases. Then, when the time counter is a counter upper limit value Cnt_max that is decided in advance, the relaxation degree of the torque limit is a lower limit value Rmin %, and the motor torque limit is at the upper limit. In a case where the control is performed according to the relation of the time counter and the relaxation degree of the torque limit shown in FIG. 9, the longer the duration time of the present motor lock state becomes, the larger the divergence between the other phase estimated temperatures and the coil sensor temperature becomes. Accordingly, the relaxation degree of the motor torque limit is reduced and thus the motor torque is reduced.

As stated above, the motor torque control portion 157 changes a reduction amount of the motor torque on the basis of the duration time of the present motor lock state. Specifically, the longer the duration time of the current motor lock state is, the more the motor torque is reduced. The longer the duration time of the present motor lock state is, the larger the divergence between other phase estimated temperatures and the coil sensor temperature is expected. Accordingly, by increasing the reduction amount of the motor torque, the electric current flowing to other phase coils can be reduced, thereby preventing the other phase estimated temperatures from exceeding the heat allowable limit temperature Tmax of the coil. Consequently, it can be avoided that the negative influence caused by the heat occurs at the coils.

The longer the duration time of the present motor lock state is, the larger the motor torque control portion 157 makes the reduction amount of the torque limit. Consequently, the other phase temperatures or the coil sensor temperature is made not to exceed the heat allowable limit temperature Tmax of the coil, thereby preventing the occurrence of the negative influence to the coils due to the heat.

On the other hand, the explanation will be made for a case in which it is determined at Step S62 that the motor lock state is not established.

(Step S63) In a case where it is determined at Step S62 that the motor lock state is not established, the motor torque control portion 157 determines whether or not the elapsed time from the time when the most recent motor lock state was released is less than a time period for which the motor lock state existed. Specifically, as an example, the motor torque control portion 157 determines whether or not the time counter is larger than 0. That is, if the time counter is larger than 0, the elapsed time from the time when the most recent motor lock state was released is shorter than the duration time of the most recent motor lock state. Thus, it is expected that the divergence between the other phase estimated temperatures and the coil sensor temperature is large. On the other hand, in a case where the time counter is equal to or less than 0, the elapsed time from the time when the most recent motor lock state was released is equal to or longer than the duration time of the most recent motor lock state. Thus, it is estimated that the divergence between the other phase estimated temperatures and the coil sensor temperature is small.

(Step S65) In a case where it is estimated at Step S63 that the time counter is larger than 0, the time counter is counted down by 1 and the process moves to Step S66. Then, the motor torque control portion 157 decides the estimated temperature as described above. At Step S70, the motor torque control portion 157 determines whether or not the temperatures-to-be-determined of all the phases exceed the threshold temperature. In a case where the temperatures-to-be-determined of all the phases do not exceed the threshold temperature, as the time counter is larger than 0 (Step S72 YES), the motor torque control portion 157 reduces the relaxation degree of the motor torque limit at Step 73 as shown in FIG. 9 in such a manner that the larger the magnitude of the time counter is, the lower the relaxation degree of the motor torque limit is made. Here, the magnitude of the time counter is a value obtained by subtracting the elapsed time elapsed since the time when the most recent motor lock state was released from the duration time of the most recent motor lock state. As stated above, when compared to the duration time period of the most recent motor lock state, the shorter the elapsed time period from the time when the most recent motor lock state was released is, the lower the motor torque control portion 157 reduces the motor torque. The shorter the elapsed time period from the time when the most recent motor lock state was released is compared to the duration time period of the most recent motor lock state, the larger divergence is expected between the other phase estimated temperatures and the coil sensor. By increasing the reduction amount of the motor torque accordingly, the current which flows to the other phase coils can be reduced. As a result, the other phase estimated temperatures can be prevented from exceeding the heat allowable limit temperature Tmax of the coils, and thereby preventing the occurrence of the negative influence due to the heat.

On the other hand, a process in a case where the time counter is determined to be 0 at Step 63 will be described.

(Step S68) In a case where it is determined at Step S63 that the time counter is equal to or less than 0, the coil sensor temperature Tsensor is decided as the temperature-to-be-determined of each phase (T5$u$=T5$v$=T5$w$=Tsensor).

(Step S69) Next, the motor torque control portion 157 updates the previous estimated temperature T0$u$ of the U-phase with the coil sensor temperature Tsensor, updates the previous estimated temperature T0$v$ of the V-phase with the coil sensor temperature Tsensor, and updates the previous estimated temperature T0$w$ of the W-phase with the coil sensor temperature Tsensor (T0$u$=T0$v$=T0$w$=Tsensor).

(Step S70) Next, the motor torque control portion 157 determines whether or not the temperature-to-be-determined, that is, the coil sensor temperature Tsensor, exceeds the threshold temperature Tth.

(Step S71) In a case where it is determined at Step S70 that the temperature-to-be-determined, that is, the coil sensor temperature Tsensor, exceeds the threshold temperature Tth, the motor torque control portion 157 reduces the motor torque in such a manner that, for example, the larger the value obtained by subtracting the threshold temperature Tth from the coil sensor temperature Tsensor is, the lower the motor torque is reduced, so that the relation between the representative estimated temperature and the motor torque shown in FIG. 8 is established. Thus, the higher the coil sensor temperature Tsensor becomes beyond the threshold temperature Tth, the lower the motor torque becomes, and accordingly the coil sensor temperature Tsensor can be prevented from exceeding the heat allowable limit temperature Tmax of the coil. Consequently, it can be prevented that the negative influence due to the heat occurs to any of the three-phase coils.

(Step S72) In a case where it is determined at Step S70 that the temperature-to-be-determined, that is, the coil sensor temperature Tsensor, is equal to or less than the threshold temperature Tth, as the time counter is 0 (Step S72 NO), the process moves to Step S74 and the motor torque control portion 157 eliminates the torque limit.

At Step S70 of FIG. 7, the motor torque control portion 157 determines whether or not the temperatures-to-be-determined (T5$u$, T5$v$, T5$w$) of all the phases exceed the threshold temperature. The motor torque control portion 157, however, may determine whether or not the temperature-to-be-determined of a particular phase exceeds the threshold temperature. In addition, at Step S70 of FIG. 7, it is determined whether or not the temperatures-to-be-determined of all the phases exceed the threshold determination temperature. However, it is not limited thereto, and it may be determined whether or not the representative estimated temperature decided with the use of the other phase estimated temperatures (for example, the largest value, the median value, the smallest value, the average value of the estimated temperatures of the three phases), or one or two other phase estimated temperatures exceed the threshold determination temperature. As stated above, the motor torque control portion 157 may determine whether or not the representative estimated temperature decided by using the other phase estimated temperatures, or at least one of the other phase estimated temperatures exceeds the threshold temperature. In a case where the threshold temperature is exceeded, the motor torque control portion 157 may limit the motor torque.

The motor torque control portion 157 may correct the estimated temperatures obtained at Step S64, in a similar manner to Step S32 of FIG. 6.

As described above, at the control system 100 for the vehicle drive motor related to the second embodiment, in a case where the other phase estimated temperatures are equal to or less than the threshold temperature, the motor torque control portion 157 reduces the motor torque in such a manner that the longer the duration time of the present motor lock state is, the more the motor torque is reduced, or in such a manner that, in comparison to the duration time of the most recent motor lock, the shorter the elapsed time from the time when the most recent motor lock state was released is, the more the motor torque is reduced. The longer the duration time of the present motor lock state is, it is estimated that the larger the divergence exists between the other phase estimated temperatures and the coil sensor temperature. Accordingly, by increasing the amount of the motor torque reduction, the electric currents flowing to other phase coils can be reduced. In addition, in comparison with the duration time of the most recent motor lock state, the shorter the elapsed time is, the larger divergence is expected between the other phase estimated temperatures and the coil sensor temperature. The elapsed time is the time elapsed since when the most recent motor lock state was released. Therefore, by increasing the motor torque reduction amount accordingly, the electric currents flowing to the other phases can be reduced. As a result, the other phase estimated temperatures can be prevented from exceeding the heat allowable limit temperature Tmax of the coil, thereby to prevent the negative influence due to the heat from occurring to the coils.

In the present embodiment, in a case where the motor lock is released, the shorter the elapsed time from the time when the most recent motor lock state was released is compared to the duration time of the most recent motor lock state, the lower the motor torque is reduced by the motor torque control portion 157. However, the present embodiment is not limited thereto. The longer an energization time at the most recent motor lock state is, the lower the motor torque control portion 157 may reduce the motor torque. Alternatively, the longer the duration time of the most recent motor lock state is, the lower the motor torque control portion 157 may reduce the motor torque. Alternatively, the larger variation of the estimated temperatures (for example, a difference between the largest value and the smallest value of the estimated temperatures, dispersion of the estimated temperatures, a standard deviation of the estimated temperatures) is, the lower the motor torque control portion 157 may reduce the motor torque. Alternatively, the larger a difference between the estimated temperatures (the other phase estimated temperatures or the estimated temperature of the specific phase) and the coil sensor temperature is, the lower the motor torque control portion 157 may reduce the motor torque. Accordingly, the larger the variation of the temperatures among the coils, the lower the motor torque can be reduced, and thus the electric currents flowing to the other phase coils can be reduced. As a result, the other phase estimated temperatures can be prevented from exceeding the heat allowable limit temperature Tmax of the coil, thereby preventing the negative influence due to the heat from occurring to the coils.

The invention is not limited to the embodiments which are described above and are shown in the drawings, and may be appropriately changed or modified without departing from the scope.

EXPLANATION OF REFERENCE NUMERALS

M . . . vehicle, 1 . . . control apparatus, 2 . . . engine, 3 . . . motor, 4 . . . wheels, 5 . . . clutch, 6 . . . automatic transmission, 7 . . . differential gear apparatus (diff.), 8 . . . second clutch, 9 . . . inverter, 10 . . . battery, 31 . . . rotor, 32 . . . stator, 33 . . . rotational angle sensor, 34 . . . temperature sensor (coil temperature detection portion), 35U, 35V, 35W . . . current sensors, 11 . . . hybrid control portion, 12 . . . clutch control portion, 13 . . . transmission control portion, 14 . . . engine control portion, 15 . . . motor control portion, 151 . . . storage portion, 152 . . . a number of motor rotations obtaining portion, 153 . . . coil sensor temperature obtaining portion, 154 . . . previous estimated temperature obtaining portion, 155 . . . motor torque obtaining portion, 156 . . . current distributing state obtaining portion, 157 . . . motor torque control portion (control portion)

The invention claimed is:

1. A control system for a vehicle drive motor, the control system comprising:
a motor torque obtaining portion obtaining motor torque which a three-phase alternating current motor outputs;
a current distributing state obtaining portion obtaining a state of current distribution to coils of respective phases of a stator of the three-phase alternating current motor;
a temperature sensor detecting temperature of a specific phase coil included in the three phase coils as a coil sensor temperature;
a motor torque control portion updating other phase estimated temperatures by using the coil sensor temperature and an added-up value of a temperature rise per unit time of each of other phase coils at each time point, the other phase coils corresponding to coils other than the specific phase coil included in the three phase coils, the other phase estimated temperatures corresponding to estimated temperatures of the other phase coils; and
the motor torque control portion controlling the motor torque by using at least the other phase estimated temperatures, wherein the temperature rise per unit time of each of the other phase coils at each time point is determined by the motor torque control portion in accordance with a combination of the motor torque and the state of current distribution at each time point.

2. The control system for the vehicle drive motor according to claim 1, wherein
the motor torque control portion determines whether or not a representative estimated temperature decided with the use of the other phase estimated temperatures or at least one of the other phase estimated temperatures exceeds a threshold temperature, and
in a case where the threshold temperature is exceeded, the motor torque control portion limits the motor torque.

3. The control system for the vehicle drive motor according to claim 1, wherein
the motor torque control portion determines whether or not the three-phase alternating current motor is in a motor lock state by using at least one of the motor torque and a number of rotations of the three-phase alternating current motor, and
in a case where the three-phase alternating current motor is in the motor lock state, the motor torque control portion updates at least the other phase estimated temperatures.

4. The control system for the vehicle drive motor according to claim 1, wherein
the motor torque control portion determines whether or not a difference between a previous representative estimated temperature decided with the use of the other phase estimated temperatures which are updated previously and the coil sensor temperature exceeds a threshold value, or whether or not a time period in which a number of rotations of the three-phase alternating current motor exceeds a predetermined number of rotations continuously is equal to or less than a threshold time period, and
in a case where it is determined that the difference exceeds the threshold value or the time period is equal to or less than the threshold time period, the motor torque control portion updates at least the other phase estimated temperatures.

5. The control system for the vehicle drive motor according to claim 1, wherein
the motor torque control portion determines whether or not an elapsed time from a time when a most recent motor lock state was released is less than a duration time of the most recent motor lock state, and
in a case where the motor torque control portion determines that the elapsed time is less than the duration time, the motor torque control portion updates at least the other phase estimated temperatures.

6. The control system for the vehicle drive motor according to claim 1, wherein the updated other phase estimated temperatures are corrected with the use of a comparison result between an estimated temperature of the specific phase and the coil sensor temperature.

7. The control system for the vehicle drive motor according to claim 2, wherein, in a case where the representative estimated temperature or the other phase estimated temperatures is equal to or less than the threshold temperature, the motor torque control portion reduces the motor torque in such a manner that the shorter an elapsed time from a time at which a most recent motor lock state was released is compared to a duration time of the most recent motor lock state, the lower the motor torque is reduced.

8. The control system for the vehicle drive motor according to claim 2, wherein, in a case where the representative estimated temperature or the other phase estimated temperatures is equal to or less than the threshold temperature, the motor torque control portion reduces the motor torque in such a manner that the longer a duration time of a present motor lock state is, the lower the motor torque is reduced.

9. The control system for the vehicle drive motor according to claim 2, wherein, in a case where the representative estimated temperature, the other phase estimated temperatures, or the coil sensor temperature exceeds the threshold temperature, the motor torque control portion reduces the motor torque in such a manner that the larger a value obtained by subtracting the threshold temperature from the representative estimated temperature, the other phase estimated temperatures, or the coil sensor temperature is, the lower the motor torque is reduced by the motor torque control portion.

* * * * *